United States Patent [19]

Yamamoto et al.

[11] Patent Number: 4,485,138
[45] Date of Patent: Nov. 27, 1984

[54] HEAT-RESISTANT SHEET GASKET

[75] Inventors: Tsutomu Yamamoto; Masaaki Ashizawa; Yutaka Shimoda, all of Yokohama, Japan

[73] Assignee: Nichias Corporation, Tokyo, Japan

[21] Appl. No.: 428,667

[22] Filed: Sep. 30, 1982

[30] Foreign Application Priority Data

Dec. 16, 1981 [JP] Japan ................ 56-203102

[51] Int. Cl.$^3$ .............................................. B32B 3/10
[52] U.S. Cl. .............................. 428/131; 277/235 B;
277/235 R; 277/DIG. 6; 428/138; 428/140;
428/156; 428/171; 428/182; 428/233; 428/244;
428/247; 428/256; 428/283; 428/285; 428/323;
428/325; 428/444; 428/457
[58] Field of Search ............... 428/156, 165, 171, 172,
428/182, 188, 244, 247, 250, 256, 263, 280, 281,
282, 283, 285, 288, 492, 496, 325, 465, 457, 444,
138, 131, 140, 233, 323; 277/235 R, 235 B,
DIG. 6

[56] References Cited

U.S. PATENT DOCUMENTS

| 2,758,952 | 8/1956 | Toulman | 428/239 |
| 2,884,161 | 4/1959 | Hurd et al. | 428/492 |
| 4,037,009 | 7/1977 | Severensen | 428/256 |
| 4,049,856 | 9/1977 | Adams | 428/465 |
| 4,234,638 | 11/1980 | Yamazoe et al. | 428/256 |

Primary Examiner—James J. Bell
Attorney, Agent, or Firm—Birch, Stewart, Kolasch & Birch

[57] ABSTRACT

A milled blend is prepared, which comprises extremely short fibers and rubber as well as a suitable amount of long fibers having hair root-like branches or a number of whiskers and/or bent long fibers and, optionally, a suitable amount of fillers. The milled blend is then laminated under pressure on both sides of a hooked, corrugated or embossed thin metal sheet, and vulcanized in a suitable manner. The resulting sheet gasket excels in sealing properties, heat resistance and durability.

15 Claims, 10 Drawing Figures

HEAT-RESISTANT SHEET GASKET

FIELD OF THE INVENTION

The present invention relates to gasket materials used in various mechanical parts inclusive of automobile parts and, more particularly, to improvements in heat-resistant sheet gaskets for sealing parts exposed to high temperatures.

Heretofore, flexible elastomers obtained by vulcanizing a milled blend of asbestos fibers with rubber into sheetings have been known as suitable material for gaskets. For high-temperature purposes, such flexible elastomer sheets are laminated on both sides of a thin metal sheet since the gasket is prone to deteriorate by thermal vibration or pressure.

To improve the joining of the flexible elastomer sheets to the metal sheet, a number of upright hooks are provided on both sides of the metal sheet. The elastomer sheets may then be applied under pressure on both sides of the metal sheet. Alternatively, a milled blend of asbestos with rubber may be applied directly on both sides of the metal sheet with the aid of a calender roll.

With the former gasket, however, the hooks of the metal sheet may be forced down under pressure, so that they tend to lose their own function. Since it is difficult to force the elastomer sheets to the roots of the hooks, a joining force larger than expected is not obtained at all, so that the elastomer sheets tend to separate from the metal sheet. Thus, this gasket poses a gas- or oil-leakage problem.

In this case of the sheet gasket prepared by calendering, on the other hand, it is required to use a milled blend of asbestos with rubber having good flowability so as to provide a uniform coating thereof on the hooked metal sheet. Suitable for that purpose is a milled blend which is rich in rubber and uses short asbestos fibers. However, the resulting gasket deteriorates at high temperatures, although it works well at lower temperatures. In addition, the gasket may either be subjected to flow, or undergo an increase in the degree of stress relaxation, at its flexible portion. For these reasons, such a sheet gasket has limited use.

That is, the conventional heat-resistant sheet gasket poses a problem that it must comply with two requirements entirely opposite to each other, one being that the flexible elastomer layers are made intimate with the use of short fibers so as to ensure sealing properties, and the other that the flexible elastomer layer be reinforced with long fibers to ensure resistance to flow and stress relaxation.

Now that the heat-resistant sheet gasket has for its main object to seal an internal fluid, the reinforcing long fibers should be dispersed uniformly throughout, and bonded firmly to, a rubber matrix. However, the long fibers are usually entangled with one another into lumps or masses. The rubber matrix is then bonded to the outside of the such lumps in which the long fibers are merely entangled with one another. Particularly, synthesized polymeric fibers are bonded to one another with a limited entanglement force due to their linearity, and are bonded to the rubber matrix through an insufficient area of contact owing to their limited specific surface area, thus leading to a lowering of the bonding force between the fibers and the rubber matrix. As demonstrated by tensile break testing of a flexible elastomer sheet formed partly of synthesized polymeric fibers which are found to be present as whiskers throughout the rupture cross-section thereof, this results in an elastomer sheet which shows a low degree of resistance to rupture.

For the reasons as mentioned above, asbestos fibers having a large specific surface area have usually been used in the conventional heat-resistant sheet gasket.

SUMMARY OF THE INVENTION

The present invention provides a solution to the abovementioned problems.

Therefore, it is a main object of the present invention to provide a novel heat-resistant gasket which is obtained by vulcanizing a milled blend of fibers with rubber as is the case with the prior art, but takes full advantage of both long and short fibers and possesses sealing properties, heat-resistance and durability in its entirety.

According to the present invention, this object is achieved by preparing a milled blend comprising extremely short fibers and rubber as well as a suitable amount of long fibers having hair root-like branches or a number of whiskers and/or bent fibers and, optionally, a suitable amount of fillers, and laminating the said blend under pressure on both sides of a thin metal sheet followed by vulcanization.

BRIEF DESCRIPTION OF THE DRAWINGS

Other objects and features of the present invention will become apparent from a reading of the following detailed explanation with reference to the accompanying drawings, in which.

DETAILED EXPLANATION OF PREFERRED EMBODIMENTS

The extremely short fibers used in the present invention should preferably have an aspect ratio of 10 to 100 and a specific surface area of 0.4 to 0.8 m$^2$/g. Preferable fibers are wollastonite (needle crystals of $C_aSiO_3$) or asbestine that is extremely short fibers of asbestos.

Preferable as the long fibers having hair root-like branches or a number of whiskers are fibrillated fibers of synthetic polymers such as aromatic polyamide, acryl, polyethylene and the like. These fibers can easily be fibrillated by wetbeating them in a beater under the influence of a strong shearing force followed by drying, and treating the thus dried product in a dry-type disintegrator.

Preferably as the bent long fibers are cellulose fibers which have a slight number of branches or whiskers, and can be used as such without fibrillation.

The rubber used as a binder for the fibers includes natural and/or synthetic rubber.

In the present invention, clay may be added as a filler for the reinforcement of rubber, and finely divided carbon, aluminum, copper, copper alloys, stainless steel and steel may be added as thermally conductive fine particles for the acceleration of heat dissipation from the formed gasket.

Preferably, the starting composition according to the the present invention is:

| | |
|---|---|
| Extremely Short Fibers: | 50–70 wt. % |
| Rubber: | 10–20 wt. % |
| Fibrillated or Bent: Long Fibers: | 10–20 wt. % |
| Reinforcing filler: | 10–20 wt. % |
| Thermally Conductive: Fine Particles: | 5–10 wt. % |

A milled blend having the composition as mentioned above may be applied directly on a hooked thin metal sheet for lamination. For lamination, thermosetting resin, synthetic rubber modified with thermosetting resin, etc. may also be applied on a thin metal sheet and dried thereon to form an adhesive layer which helps increase a bonding force relative to the laminated product.

In thus obtained flexible elastomer laminate, the fibrillated or bent long fibers are firmly bonded to the rubber matrix, whereby its strength is improved markedly. Thus, according to the present invention, a larger amount of long fibers is not required, so that uniform mixing of the fibers with rubber may easily be achieved.

Figure 1:
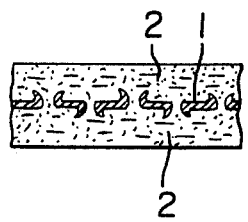
FIGS. 1 through 4 inclusive are longitudinally sectioned views showing the preferred embodiments of the heat-resistant sheet gasket according to the present invention.
Figure 1A:
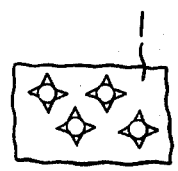
FIG. 1A is a plan view of the thin metal sheet used in FIG. 1.
Figure 2:
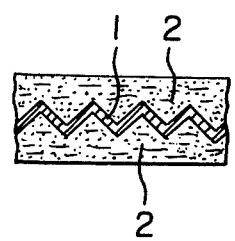
Figure 3:
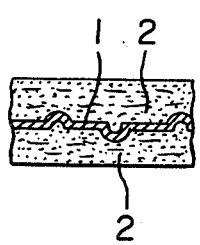
Figure 4:
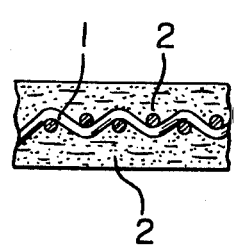

FIGS. 1–4 show four types of the sheet gasket prepared by laminating the above-mentioned blend on both sides of various thin metal sheets. In the drawings, a thin metal sheet 1, and a flexible elastomer layer 2 are illustrated. The thin metal sheet used in the embodiment of FIGS. 1 and 1A is hooked, the thin metal sheet of FIG. 2 is corrugated, the thin metal sheet of FIG. 3 is embossed, and the thin metal sheet of FIG. 4 is a wire gauze.

For a better understanding of the present invention, the following non-restrictive examples will be given.

EXAMPLE 1

| Composition | Amount in wt. % |
|---|---|
| Wollastonite | 59 |
| NBR | 16 |
| Cellulose Fibers (obtained from commercially available fibers in the form of cardboard treated in a beater) | 10 |
| Filler (clay) | 5 |
| Carbon | 6 |
| Rubber Vulcanizer | 4 |

The rubber had been swollen in toluene in an amount of 0.7 liters per one kilogram of the starting composition. The thus swollen product was stirred at a low speed in a kneader into a viscose paste of rubber, to which were successively added the above-mentioned components. The resulting product was stirred at a high speed for 2 hours to obtain a uniformly milled blend.

Apart from this, a thin metal sheet provided with four round hooks having a diameter of 1 m/m, as shown in FIGS. 1 and 1A, had been immersed in liquid phenol resin, and cured for 15 minutes at 150° C. upon air drying.

The blend was coated on both sides of the thin metal sheet set on a coating machine to a thickness of 1.3 m/m. The obtained sheet was vulcanized at 120° C. for 15 minutes into a heat-resistant sheet gasket.

EXAMPLE 2

| Composition | Amount in wt. % |
|---|---|
| Wollastonite | 62 |
| NBR | 16 |
| Fibrillated Fibers of Aromatic Polyamide (manufactured by Du Pont and available under the trade mark of KEPLER PULP) | 7 |
| Filler (clay) | 5 |
| Iron Powder | 6 |
| Rubber Vulcanizer | 4 |

The blend having the composition as mentioned above was treated in the same manner as described in Example 1 into a heat-resistant sheet gasket.

EXAMPLE 3

| Composition | Amount in wt. % |
|---|---|
| Wollastonite | 56 |
| NBR | 16 |
| Cellulose Fibers | 8 |
| Fibrillated Fibers of Aromatic Polyamide | 5 |
| Filler (clay) | 5 |
| Carbon | 6 |
| Rubber Vulcanizer | 4 |

A milled blend having the above-mentioned composition was formed into a heat-resistant gasket in the manner as described in Example 1.

The thin metal sheet used was a cold-rolled steel plate which had a crest of 1 m/m and a pitch of 1.7 m/m, as shown in FIG. 2.

EXAMPLE 4

| Composition | Amount in wt. % |
|---|---|
| Wollastonite | 54 |
| NBR | 16 |
| Fibrillated Acryl Fibers (prepared by charging chopped fibers, commercially available, having a length of 6 m/m together with water into a beater, and applying a strong shearing force thereto followed by drying) | 15 |
| Filler (clay) | 5 |
| Carbon | 6 |
| Rubber Vulcanizer. | 4 |

A milled blend having the above-mentioned composition was formed into a heat-resistant sheet gasket in the manner as described in Example 1.

The thin metal sheet used was the same as that used in Example 3.

COMPARISON EXAMPLE 1

| Composition | Amount in wt. % |
|---|---|
| Asbestos Fibers | 69% |
| NBR | 16 |

-continued

| Composition | Amount in wt. % |
|---|---|
| Filler (clay) | 5 |
| Carbon | 6 |
| Rubber Vulcanizer | 4 |

A milled blend having the above-mentioned composition was formed into a heat-resistant sheet gasket in the manner as described in Example 1.

COMPARISON EXAMPLE 2

| Composition | Amount in wt. % |
|---|---|
| Wollastonite | 54 |
| NBR | 16 |
| Acryl Fibers (chopped fibers, commercially available, having a length of 6 m/m) | 15 |
| Filler (clay) | 5 |
| Carbon | 6 |
| Rubber Vulcanizer | 4 |

A milled blend having the above-mentioned composition was formed into a heat-resistant sheet gasket in the manner as described in Example 1.

Table 1 shows the typical physical properties of the heat-resistant gaskets obtained in the examples and comparison examples.

TABLE 1

| | Example (1) | Comp. Example (1) | Example (2) | Example (3) | Example (4) | Comp. Example (2) |
|---|---|---|---|---|---|---|
| Thickness (mm) | 1.32 | 1.31 | 1.35 | 1.34 | 1.35 | Poor mixture so that it could not be coated. (Physical properties could not be measured) |
| Bulk Density (g/cm³) | 2.92 | 2.72 | 2.81 | 2.85 | 2.96 | |
| Compression (%) | 9 | 14 | 6 | 13 | 8 | |
| Recovery (%) | 53 | 55 | 38 | 57 | 64 | |
| Stress Relaxation (%) | 32 | 40 | 45 | 40 | 43 | |
| Resistance to Lubricating Oil | | | | | | |
| Change in Thickness (%) | 2 | 5 | 4 | 6 | 5 | |
| Change in Weight (%) | 3 | 9 | 7 | 9 | 3 | |

It should be noted that the figures for the physical properties were obtained according to the testing methods specified in JIS R 3453, and that the stress relaxation was measured at a clamp pressure of 210 Kgf/cm² and a heating temperature of 180° C. for a heating period of 22 hours according to ASTM F38.

EXAMPLE 5

The heat-resistant sheet gasket obtained in Example 2 was punched into a gasket adapted to be used with a flange for piping (JIS 10 K 75 A). The gasket was set on that flange at a clamp pressure of 200 Kgf/cm². Lubricating oil of ATSM No. 3 heated to 150° C. was charged into a testing vessel for 168 hours for leakage inspection. It has been found that the sheet gasket shows no sign of external abnormality or leakage.

EXAMPLE 6

Figure 5:
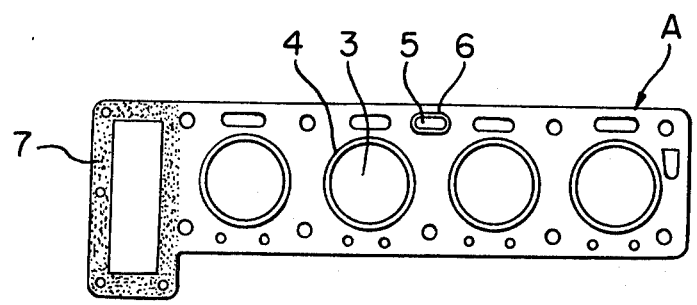
FIG. 5 is a plan view of a modification of the sheet gasket according to the present invention, which is designed to be used for sealing the cylinder head of an internal combustion engine.
Figure 6:
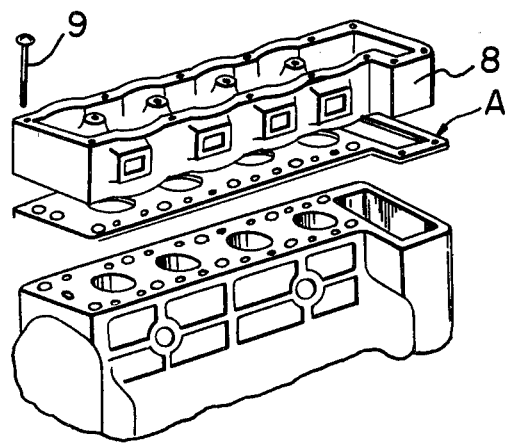
FIG. 6 is a perspective view of the gasket of FIG. 5 which is mounted on that cylinder head.

The heat-resistant sheet gasket obtained in Example 1 was punched into a gasket A to be used with the cylinder head of an internal combustion engine. As depicted in FIG. 5, the gasket A included cylinder bores 3 to be exposed directly to combustion gases, which bores were provided with grommets 4 of a soft steel plate SPCC having a thickness of 0.2 m/m and a width of 3 m/m, a lubricating oil hole 5 provided with a grommet 6 of a copper plate CuP having a thickness of 0.15 m/m and a width of 2 m/m and a section to be associated with a chain case, which section was provided thereon with a 0.5 m/m-thick surface coating film of a synthetic rubber sealing agent. As illustrated in FIG. 6, this gasket A was attached to the cylinder head at a torque of 800 Kgf/cm with a clamp bolt 9. Durability testing was performed using an engine which was repeatedly brought in operation at 6,000 r.p.m. for 10 minutes and kept idle at 1,000 r.p.m. for 10 minutes, and forcedly cooled with water. As will be appreciated from Table 2, the results of durability testing were satisfactory.

TABLE 2

| Durability Testing | |
|---|---|
| Thickness of Gasket | 1.31 mm |
| Sealing Pressure of Cooling Water | more than 5 Kgf/cm²G |
| Sealing Pressure of Lubricating Oil | more than 7 Kgf/cm²G |
| Sealing Pressure of Combustion Gas | 45 Kgf/cm²G |
| Compression of Gasket | 8% |
| Torque Down of Clamp Bolt | 3% |
| Sign of Abnormalities such as Blow | No |

It should be noted that the above-mentioned results were estimated in the manner specified on the cylinder head gaskets for internal combustion engines by automobile makers.

EXAMPLE 7

Figure 7:
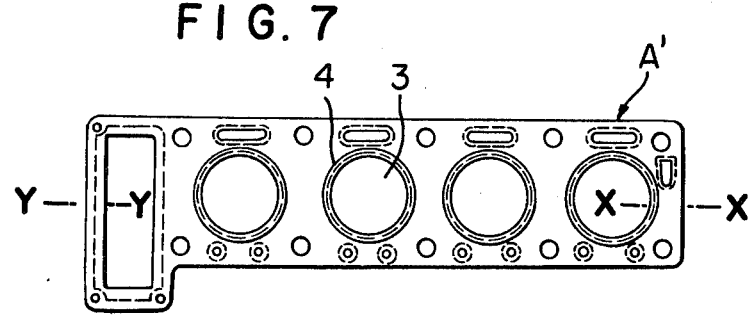
FIG. 7 is a plan view of another modification of the sheet gasket of FIG. 5.
Figure 7A:
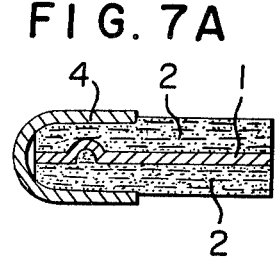
FIG. 7A is an enlarged section taken along the line X—X of FIG. 7.
Figure 7B:
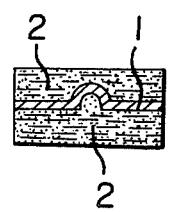
FIG. 7B is an enlarged view taken along the line Y—Y of FIG. 7.

The heat-resistant sheet gasket obtained in Example 3 was modified in such a manner that the embosses of the thin metal sheet could seal the associated portions of the cylinder head of an internal combustion engine, as depicted in FIG. 7. The thus obtained gasket A' was attached to the cylinder head of an automobile internal combustion engine at a torque of 640 Kgf/cm with a clamp bolt. A steaming test performed involved a cycle in which steam and cooling water were alternately charged into a cooling water passage for each 30 minutes. This test cycle was repeated 50 times. As will be appreciated from Table 3, the results of steaming test were satisfactory.

TABLE 3

| | | Example (7) |
|---|---|---|
| Ignition Loss | | 17% |
| Stress Relaxation | | 11% |
| Steaming Test | | |
| Water Pressure | 1.0 Kgf/cm²G | No Leakage |
| | 2.0 Kgf/cm²G | No Leakage |
| | 3.0 Kgf/cm²G | No Leakage |
| | 3.5 Kgf/cm²G | No Leakage |
| | 4.0 Kgf/cm²G | No Leakage |
| | 4.5 Kgf/cm²G | No Leakage |

TABLE 3-continued

| | Example (7) |
|---|---|
| Ignition Loss | 17% |
| Stress Relaxation | 11% |
| 5.0 Kgf/cm²G | No Leakage |

As mentioned above, the heat-resistant sheet gasket according to the present invention excels in sealing property, heat-resistance and durability in its entirety.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat-resistant sheet gasket obtained by preparing a milled blend comprising extremely short fibers of wollastonite needle crystals of $C_aSiO_3$, natural or synthetic rubber together with an amount of fibrillated polymeric long fibers having hair root-like branches, an amount of clay fillers and thermally conductive fine particles of carbon, aluminum, copper, a copper alloy, stainless steel, steel, and laminating the blend under pressure on both sides of a thin metal sheet followed by vulcanization.

2. A heat-resistant sheet gasket according to claim 1, wherein the fibrillated polymeric fibers are aromatic polyamide fibers.

3. A heat-resistant sheet gasket according to claim 1, wherein the fibrillated polymeric fibers are acryl fibers.

4. A heat-resistant sheet gasket according to claim 1, wherein said milled blend further includes cellulose fibers.

5. A heat-resistant sheet gasket obtained by preparing a milled blend consisting of 50 to 70% by weight of extremely short fibers, 10 to 20% by weight of natural or synthetic rubber and 10 to 20% by weight of at least one fiber member selected from the group consisting of fibrillated polymeric fibers and cellulosic fibers, and laminating the blend under pressure onto both sides of a thin metal sheet, followed by vulcanization.

6. The sheet gasket according to claim 5, wherein said fiber member is cellulosic fibers.

7. The sheet gasket according to claim 5, wherein the extremely short fibers are wollastonite.

8. The sheet gasket according to claim 6, wherein the extremely short fibers are wollastonite.

9. The sheet gasket according to claim 5, wherein the fibrillated polymeric fibers are selected from the group consisting of aromatic polyamide, acrylic and polyethylene fibers.

10. The sheet gasket according to claim 5, and further including 10 to 20% by weight of finely particulate filler and 5 to 10% by weight of thermally conductive fine particles.

11. The sheet gasket according to claim 6, and further including 10 to 20% by weight of finely particulate filler and 5 to 10% by weight of thermally conductive fine particles.

12. The sheet gasket according to claim 10, wherein the filler is clay, and the fine particles are those of carbon, aluminum, copper, copper alloys, stainless steel and steel.

13. The sheet gasket according to claim 5 wherein said fiber member is fibrillated polymeric fibers.

14. The sheet gasket according to claim 5, wherein said fiber member is cellulosic fiber and fibrillated fibers.

15. A heat-resistant sheet gasket obtained by preparing a milled blend comprising extremely short fibers of wollastonite needle crystals of $C_aSiO_3$, natural or synthetic rubber together with an amount of cellulous fibers, an amount of clay fillers and thermally conductive fine particles of carbon, aluminum, copper, a copper alloy, stainless steel, steel, and laminating the blend under pressure on both sides of a thin metal sheet followed by vulcanization.

* * * * *